US006889288B2

(12) United States Patent
Bono et al.

(10) Patent No.: US 6,889,288 B2
(45) Date of Patent: May 3, 2005

(54) REDUCING DATA COPY OPERATIONS FOR WRITING DATA FROM A NETWORK TO STORAGE OF A CACHED DATA STORAGE SYSTEM BY ORGANIZING CACHE BLOCKS AS LINKED LISTS OF DATA FRAGMENTS

(75) Inventors: Jean-Pierre Bono, Westboro, MA (US); Jiannan Zheng, Ashland, MA (US); Peter C. Bixby, Westborough, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 324 days.

(21) Appl. No.: 10/308,159

(22) Filed: Dec. 2, 2002

(65) Prior Publication Data

US 2004/0107318 A1 Jun. 3, 2004

(51) Int. Cl.$^7$ .......................... G06F 12/02; G06F 15/16
(52) U.S. Cl. ....................... 711/118; 711/170; 711/141; 709/232; 709/238
(58) Field of Search .................. 711/118, 129, 711/170, 173, 141, 143; 709/232, 238

(56) References Cited

U.S. PATENT DOCUMENTS

| | | | |
|---|---|---|---|
| 4,916,605 A | 4/1990 | Beardsley et al. | 364/200 |
| 5,155,845 A | 10/1992 | Beal et al. | 395/575 |
| 5,206,939 A | 4/1993 | Yanai et al. | 395/400 |
| 5,269,019 A | 12/1993 | Peterson et al. | 395/600 |
| 5,301,286 A | 4/1994 | Rajani | 395/400 |
| 5,377,342 A | 12/1994 | Sakai et al. | 395/425 |
| 5,381,539 A | 1/1995 | Yanai et al. | 395/425 |
| 5,459,857 A | 10/1995 | Ludlam et al. | 395/182.04 |
| 5,544,345 A | 8/1996 | Carpenter et al. | 395/477 |
| 5,630,067 A | 5/1997 | Kindell et al. | 395/200.09 |
| 5,893,140 A | 4/1999 | Vahalia et al. | 711/118 |
| 5,901,327 A | 5/1999 | Ofek | 395/825 |
| 6,076,148 A | 6/2000 | Kedem | 711/162 |
| 6,457,102 B1 * | 9/2002 | Lambright et al. | 711/129 |
| 2004/0034743 A1 * | 2/2004 | Wolrich et al. | 711/132 |

FOREIGN PATENT DOCUMENTS

| | | | | |
|---|---|---|---|---|
| WO | WO 91/06053 | 5/1991 | | G06F/12/00 |
| WO | WO 91/08536 | 6/1991 | | G06F/12/08 |
| WO | WO 91/08537 | 6/1991 | | G06F/12/08 |

OTHER PUBLICATIONS

Mendel Rosenblum and John K. Ousterhout, University of California at Berkley "*The Design and Implementation of a Log–Structured File System;*" ACM Transactions on Computer Systems, vol. 10, No. 1, Feb. 1992, pp. 26–52.

Fred Douglis and John K. Ousterhout, "*Log–Structured File Systems;*" Digest of Papers, Comp.con89.

Kessler, Gary C.; ISDN: concepts, facilities, and services / Gary C. Kessler, Peter V. Southwick—3$^{rd}$ ed. , 1997; pp. 32–35; pp. 393–395; pp. 474–482; pp. 524–537.

"*Internet Protocol—DARPA Internet Program—Protocol Specification;*" Sep. 1981; Information Sciences Institute, University of Southern California.

"*User Datagram Protocol;*" J. Postel, ISI, Aug. 28, 1980 (RFC 768).

"*Transmission Control Protocol—DARPA Internet Program—Protocol Specification;*" Information Sciences Institute, University of Southern California, Sep. 1981.

* cited by examiner

Primary Examiner—Jack A. Lane
(74) Attorney, Agent, or Firm—Novak Druce & Quigg, LLP; Richard Auchterlonie

(57) ABSTRACT

In a network attached cached disk storage system, data is transmitted over the network in data packets having a data length that is much smaller than the logical block size for reading or writing to disk storage. To avoid copying of data from network port buffers to the cache memory, the cache blocks of the cache memory are organized as linked lists of list elements, which can be used as network port input or output buffers. For TCP data packets, for example, each list element has a data slot for storing up to 1,500 bytes, and a field indicating the number of bytes stored in the data slot.

43 Claims, 15 Drawing Sheets

REDUCING DATA COPY OPERATIONS FOR WRITING DATA FROM A NETWORK TO STORAGE OF A CACHED DATA STORAGE SYSTEM BY ORGANIZING CACHE BLOCKS AS LINKED LISTS OF DATA FRAGMENTS

BACKGROUND OF THE INVENTION

1. Field of the Invention

The present invention relates generally to data storage systems, and more particularly to a data storage system attached to a data network for receiving and storing data from a network client.

2. Background Art

Mainframe data processing, and more recently distributed computing, have required increasingly large amounts of data storage. This data storage is most economically provided by an array of low-cost disk drives integrated with a large semiconductor cache memory. Such cached disk arrays were originally introduced for use with IBM host computers. A channel director in the cached disk array executed channel commands received over a channel from the host computer. Moreover, the cached disk array was designed with sufficient redundancy so that data written to the cache memory would be available despite any single point of failure in the cached disk array. Therefore, most applications could consider that a write from the host to the cached disk array was completed once the data was written to the cache memory. This characteristic of the cached disk array is known as a "fast write" capability because the write operation is considered to be completed much faster than the time to write the data to disk storage.

More recently there has been a trend toward attaching storage systems to data networks so that the storage is available to multiple hosts. The hosts can range from mainframe computers to engineering workstations to commodity personal computers. Due to the "fast write" capability of the cached disk array, the data network has been seen as a limitation on the performance of the network-attached storage. There has been a continuing desire to reduce the performance penalty for attaching a cached disk array to a host through a data network instead of a dedicated channel.

SUMMARY OF THE INVENTION

In accordance with a first aspect, the invention provides a storage system including a storage controller, a cache memory, and data storage. The storage controller is programmed to respond to a request to access a specified logical block of data in the data storage by accessing a logical block index to determine whether or not the specified logical block is in the cache memory. When the logical block index indicates that the logical block is in the cache memory, the storage controller accesses the logical block of data in the cache memory, and when the logical block index indicates that the logical block of data is not in the cache memory, the storage controller accesses the logical block of data in the data storage. The cache memory contains a multiplicity of logical blocks of data, each of which is organized as a respective linked list of list elements containing fragments of the data of the logical block.

In accordance with another aspect, the invention provides a storage system including a storage controller, a cache memory, and data storage. The storage controller is programmed to respond to a request to access a specified logical block of data in the data storage by accessing a logical block index to determine whether or not the specified logical block is in the cache memory. When the logical block index indicates that the logical block is in the cache memory, the storage controller accesses the logical block of data in the cache memory, and when the logical block index indicates that the logical block of data is not in the cache memory, the storage controller accesses the logical block of data in the data storage. The cache memory contains a list element pool of list elements, and at least some of the list elements in the list element pool are linked in respective lists for a multiplicity of logical blocks of data. Each list element in the list element pool includes a data slot, a field for a pointer to a next list element in the list element pool, and a field for an indication of how many bytes of data are contained in the data slot. The storage controller has a network port for attachment to a data network for communicating data packets with clients in the data network. The storage controller is programmed to use the list elements as transmit and receive buffers for communicating the data packets with the clients in the data network.

In accordance with a final aspect, the invention provides a method of operating a storage system having a storage controller, a cache memory, and data storage for storing logical blocks of data. The storage controller has a network port for attaching the storage controller to a data network for communicating data packets with clients in the data network. The storage controller is programmed to respond to a request to access a specified logical block of data in the data storage by accessing a logical block index to determine whether or not the specified logical block is in the cache memory. When the logical block index indicates that the logical block is in the cache memory, the storage controller accesses the logical block of data in the cache memory, and when the logical block index indicates that the logical block of data is not in the cache memory, the storage controller accesses the logical block of data in the data storage. The method includes the storage controller maintaining a pool of list elements in the cache memory, linking at least some of the list elements into respective linked lists for a multiplicity of the logical blocks of data stored in the data storage, and storing, in the list elements for each respective linked list for each of the multiplicity of the logical blocks of data stored in the data storage, the data of the respective logical block. The method further includes the storage controller using the list elements as transmit and receive buffers for communicating the data packets with the clients in the data network.

BRIEF DESCRIPTION OF THE DRAWINGS

Other objects and advantages of the invention will become apparent upon reading the following detailed description with reference to the drawings, in which.

Figure 1:
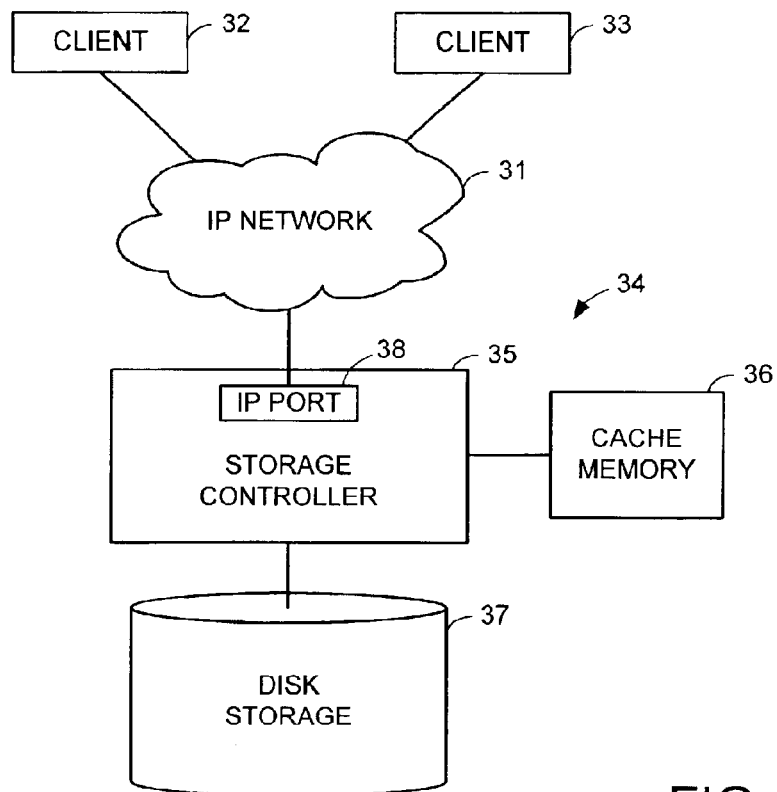
FIG. 1 shows a block diagram of a data network including a data storage system.

While the invention is susceptible to various modifications and alternative forms, a specific embodiment thereof has been shown by way of example in the drawings and will be described in detail. It should be understood, however, that it is not intended to limit the form of the invention to the particular form shown, but on the contrary, the intention is to cover all modifications, equivalents, and alternatives falling within the scope of the invention as defined by the appended claims.

DESCRIPTION OF ILLUSTRATIVE EMBODIMENTS

FIG. 1 shows an Internet Protocol (IP) network 31 linking a number of clients 32, 33 to a network-attached storage system 34. The network-attached storage system 34 includes a storage controller 35, a cache memory 36, and disk storage 37. The storage controller 35 has an IP port 38 for linking the storage controller 35 to the IP network 31.

Figure 2:
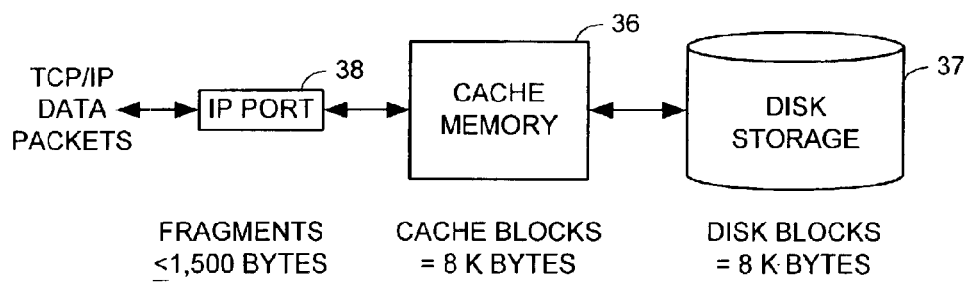
FIG. 2 is a flow diagram showing how data is written to or read from disk storage in the data storage system of FIG. 1.

Data transmission from clients 32, 33 to the storage controller 35 in the data processing system of FIG. 1 typically uses a Transmission Control Protocol (TCP) layered over the Internet Protocol. As shown in FIG. 2, when the Transmission Control Protocol is used, the IP port 38 receives data fragments from TCP/IP data packets. Each is of the data fragments is less than or equal to 1,500 bytes. The data fragments are written to cache blocks in the cache memory 36. Later, as a background process, the modified cache blocks are written back to corresponding disk blocks in the disk storage 37.

Typically, the data fragments are much smaller than the cache blocks. For example, each cache block and disk block has a data length of eight kilobytes, and at least six data fragments from the IP port 38 are needed to completely fill a cache block with new data.

During a write operation, the data fragments have been copied from an input buffer of the IP port into the cache memory blocks. The present invention provides a way of eliminating a need to copy the data fragments from an input buffer of the IP port into the cache memory blocks for most write operations.

Figure 3:
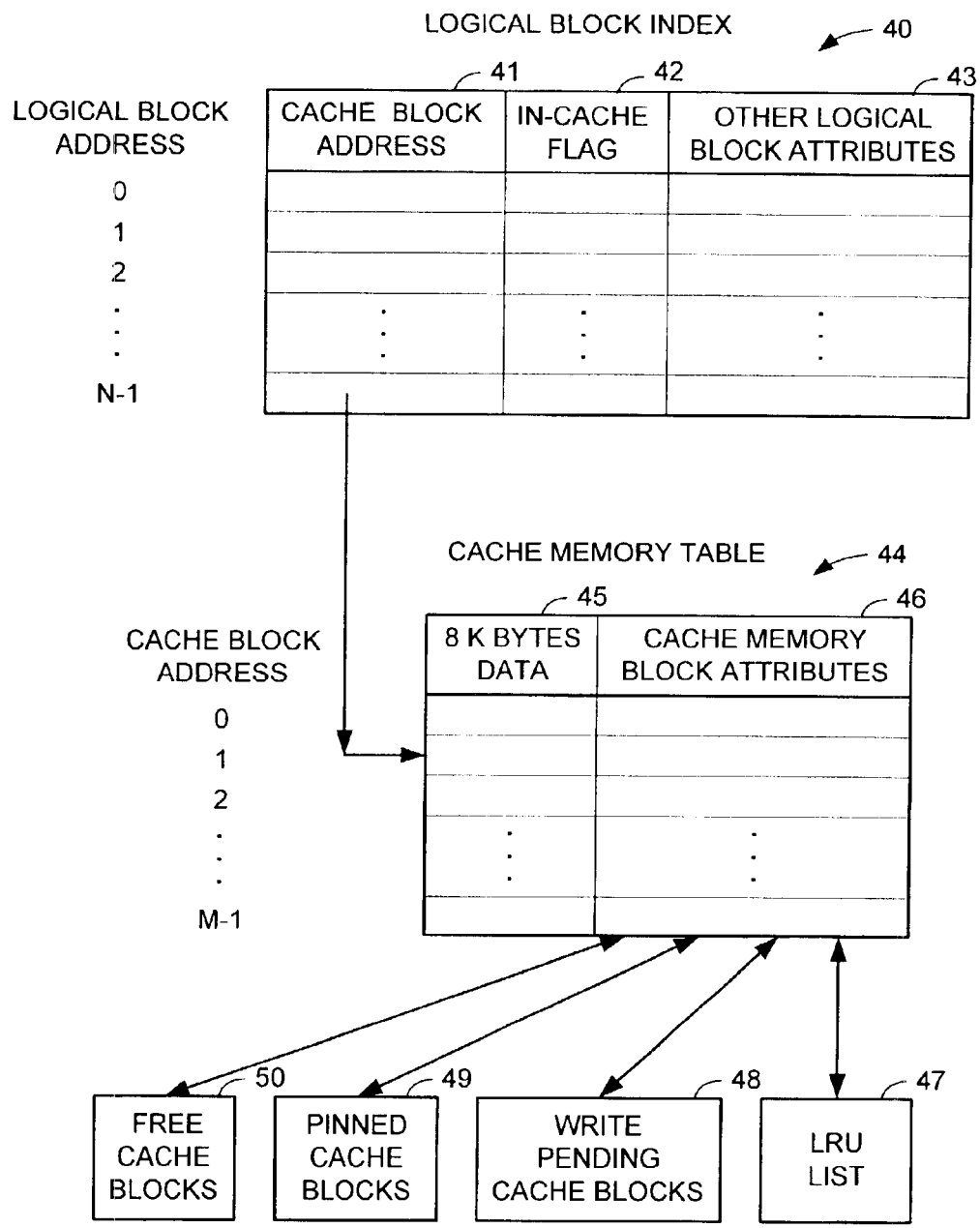
FIG. 3 shows conventional cache memory data structures for the network-attached storage of FIG. 1.

FIG. 3 shows conventional data structures for the cache memory 36 of FIG. 1. As shown in FIG. 3, these data structures include a logical block index 40 and a cache memory table 44. The logical block index 40 includes, for each logical block that is stored in the cache memory, an associated cache block address 41, and a flag 42 indicating whether or not the logical block is in cache. The logical block index 40 also includes other logical block attributes 43 of each logical block. These other logical block attributes, for example, include a logical-to-physical mapping indicating the physical location where the data of the logical block is found in the disk storage (37 in FIG. 2).

The cache memory table 44 includes, for each cache block address, a field 45 for storing eight kilobytes of data, and a field 46 for storing a number of cache memory block attributes 46. For example, the cache memory block attributes include a set of flags, including a flag indicating whether a write back is pending, a flag indicating is whether a write back operation needs to be initiated, a flag indicating whether the cache block is "pinned" or not, and a flag indicating whether the cache block is free or not.

Typically, the cache memory is operated in such a way that when a cache block is needed for storing data of a logical block and there are no free cache blocks, then the least recently used cache block will be de-allocated and reused. In order to quickly determine the least recently used cache memory block, a linked list called the least recently used (LRU) list 47 is maintained in such a way that the least recently used cache block will be found at the head of the LRU list. In particular, each time that a cache block is accessed, any pointer to the cache block already existing in the LRU list is removed from the LRU list, and a pointer to the cache block is inserted at the tail of the LRU list.

As shown in FIG. 3, a number of additional lists can be maintained in order to facilitate the use of the cache memory. For example, a list 48 can be kept of the write pending cache blocks. In this fashion, the write pending cache blocks can be serviced in such a way that priority is given to the oldest write pending request.

For some applications, it may be desired to keep data in cache until it is used, and after it is used, it no longer needs to be in cache memory. To handle such instances, there is maintained a list 49 of pinned cache blocks, and a list 50 of free cache blocks. In such a system, for example, a pointer to each cache block is found either in the LRU list 47 if the cache block is neither pinned nor free, in the list 49 of pinned cache blocks if the cache block is to remain in cache, or in the list 50 of free cache blocks if the cache block no longer needs to be in cache. For example, when a cache memory block needs to be associated with a logical block, a pointer to the block is obtained from the list 49 of free cache blocks unless this list is empty. If this list is empty, then a pointer to the cache block is obtained from the head of the LRU list 47.

The present invention relates to a novel organization of the cache memory in such a way that respective lists of list elements are used in lieu of cache memory blocks. In particular, it has been found that a network-attached storage system 34 as shown in FIG. 1 can be improved by using list elements that can also be used by the WP port 38 as transmit or receive buffers. In this case, data fragments do not need to be copied between the transmit or receive buffer of the IP port and the cache memory blocks when reading data from cache or writing new cache blocks. Instead, for each data fragment to be transmitted or received in each TCP/IP packet, a respective cache memory list element is used as a transmit or receive buffer. In this fashion, a pointer to the cache memory list element can be passed between the TCP/IP port driver program and the cache memory program instead of copying data fragments between a TCP/IP transmit or receive buffer and the cache memory.

Figure 4:
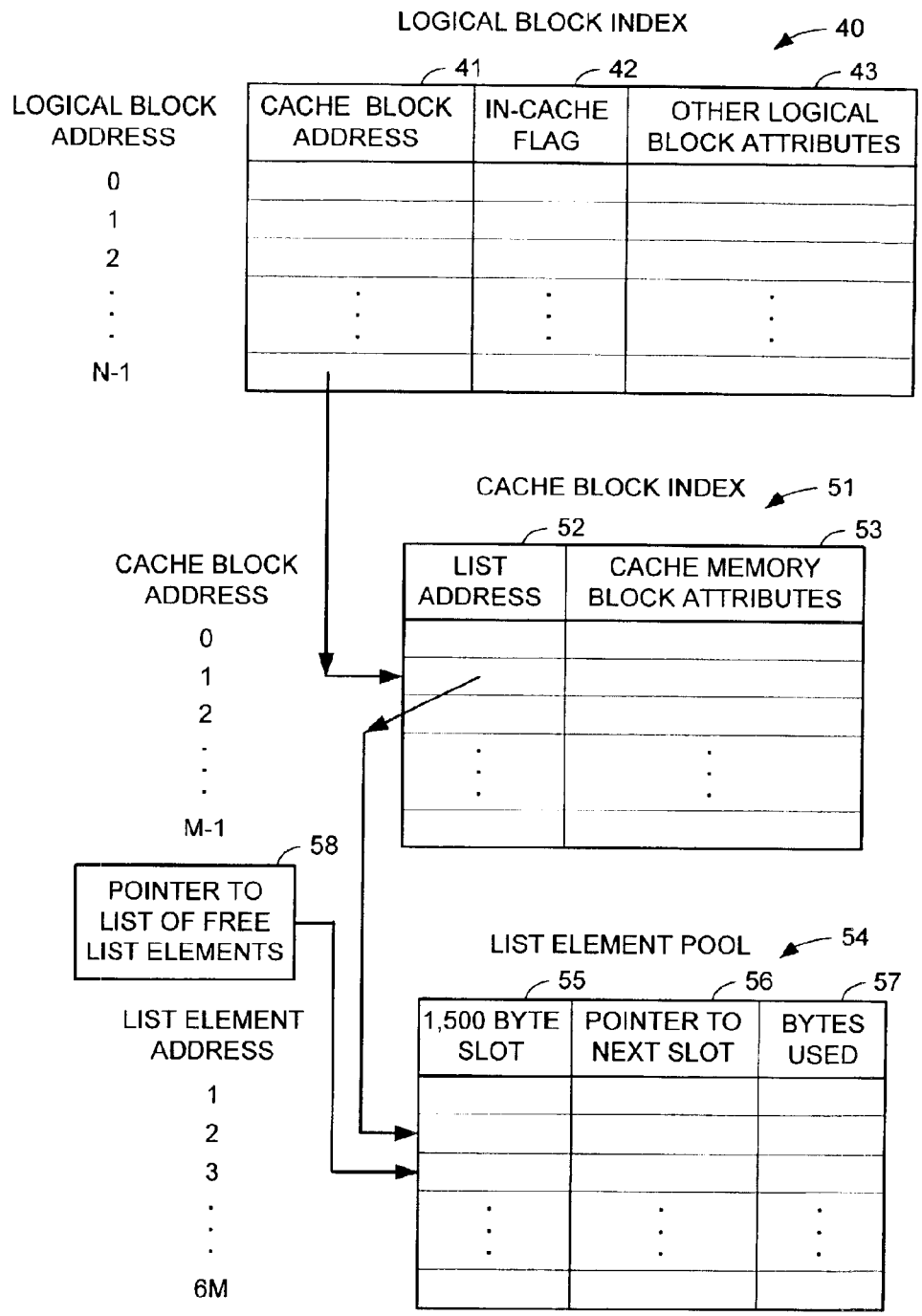
FIG. 4 shows cache memory data structures in accordance with one aspect of the invention.

FIG. 4 shows one way of carrying out the present invention by modifying the cache memory and related data structures of FIG. 3. As shown in FIG. 4, the cache memory table (44 in FIG. 3) is replaced by a cache block index 51, a list element pool 54, and a pointer 58 to a list of free list elements. The cache block index 51 is similar to the cache memory table 44, except the eight-kilobyte data blocks (44 in FIG. 3) have been replaced with list addresses 52. Each list address 52 can be either zero, indicating that there is no data or the data is zero in the cache block, or a non-zero address of a list of the list elements in the list element pool 54.

The list element pool 54 is organized as a table of list elements. In this example, is each list element includes a 1,500 byte slot 55, a field for containing a pointer to a next slot 56, and a field 57 for containing an indication of how many bytes are used in the 1,500 byte slot 55. (In an alternative arrangement, the list elements can have different lengths to accommodate various sizes for the data slot, as further below with reference to FIGS. 13 to 17.)

When a list element is used in a list, the pointer 56 to the next slot is either zero indicating that the end of a list has been reached, or is the list element address of the next list element in the list. The pointer 58 to the list of free list elements is either zero, indicating that there are no free list elements in the list element pool 54, or it points to the list element address of the first list element in the list of free list elements.

Figure 5:
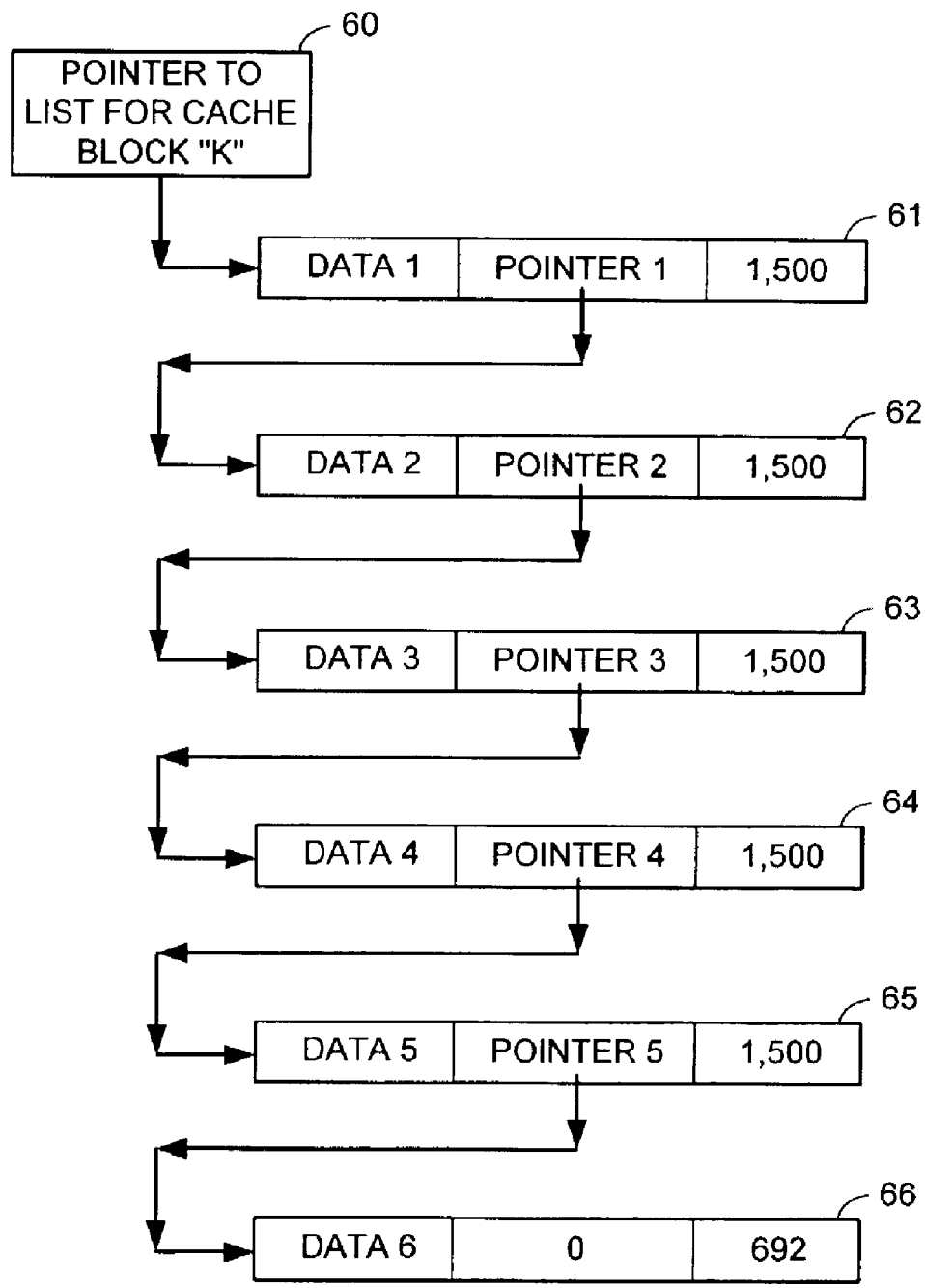
FIG. 5 is a schematic diagram showing a list of list elements for a logical block of data in the cache memory of FIG. 4.

FIG. 5 shows a preferred format for a linked list of list elements substituting for an eight-kilobyte cache memory block "K". The list includes a first list element 61, including 1,500 bytes of data of a first data fragment (DATA 1), a second list element 62 including 1,500 bytes of data of a second data fragment (DATA 2), a third list element 63 including 1,500 bytes of data of a third data fragment (DATA 3), a fourth list element 64 including 1,500 bytes of data of a fourth data fragment (DATA 4), a fifth list element 65 including 1,500 bytes of data of a fifth data fragment (DATA 5), and a sixth list element 66 including 692 bytes of data of a sixth data fragment (DATA 6). The pointer to next in the sixth list element 66 is zero, indicating the end of the list. The list address 60 points to the first list element 61 in the list.

In the example of FIG. 5, the fact that each list element except for the last list element 66 has its respective data slot completely filled by a respective data fragment is not typical for TCP. This may occur if the Universal Datagram Protocol (UDP) were used instead of TCP, or if the TCP programming layer in the client were modified. The case of a typical list of list elements for TCP is described further below with reference to FIGS. 13 to 14.

Figure 6:
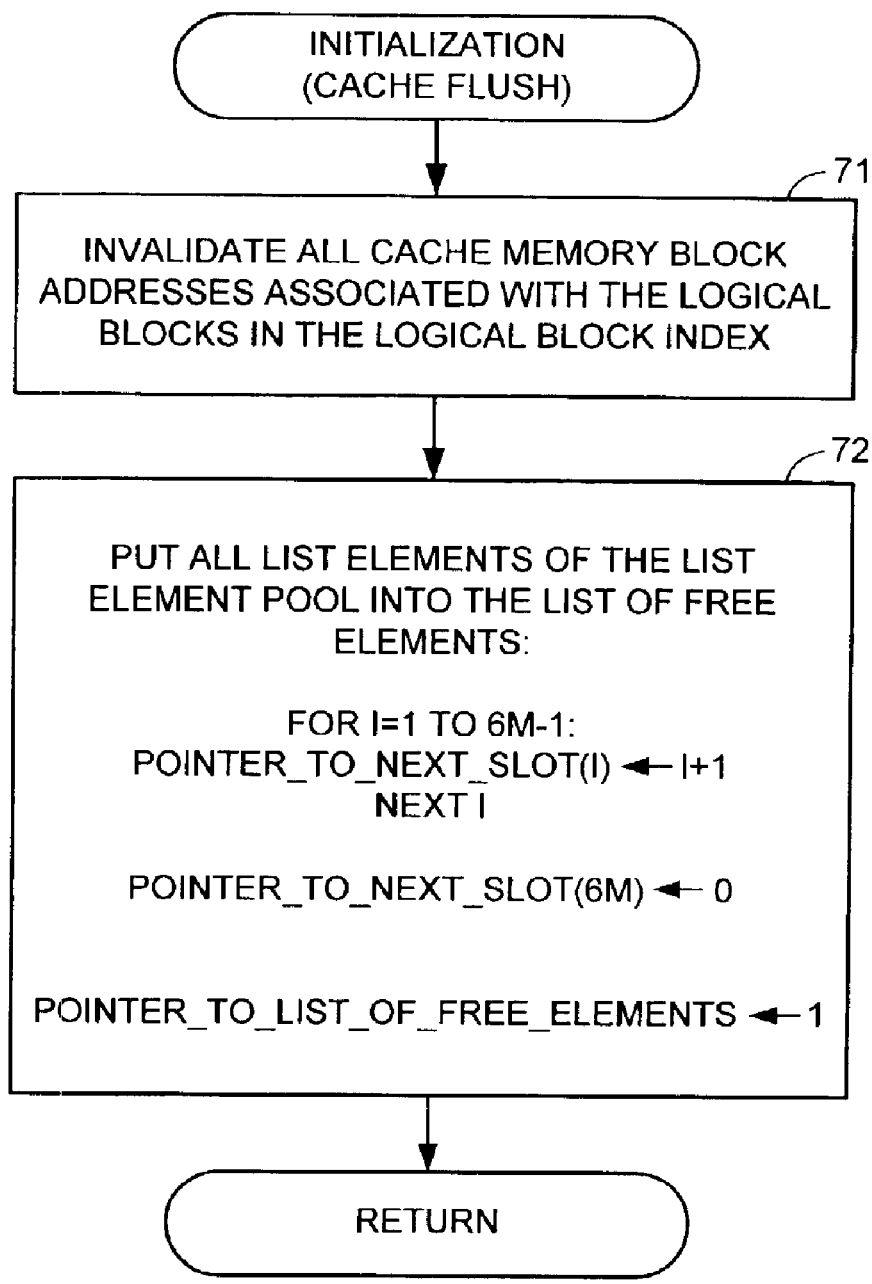
FIG. 6 is a flowchart of a procedure for initializing or flushing the cache memory of FIG.4.

FIG. 6 shows a procedure for initializing the cache memory of FIG. 3. In a first step 71, all of the cache memory block addresses associated with the logical blocks in the logical block index are invalidated. Step 71, for example, is performed in the conventional fashion by clearing the "in-cache" flags 42 in the logical block index 40. Then, in step 72, the storage controller puts all list elements of the list element pool into the list of free elements. This is done by setting the pointer to next slot of each list element to point to the next element in the list element pool, and for the last list element in the list element pool, by setting its pointer to next slot to zero. Also, the pointer 58 to the list of free list elements is set equal to 1. After step 72, the initialization procedure is finished.

Figure 7:
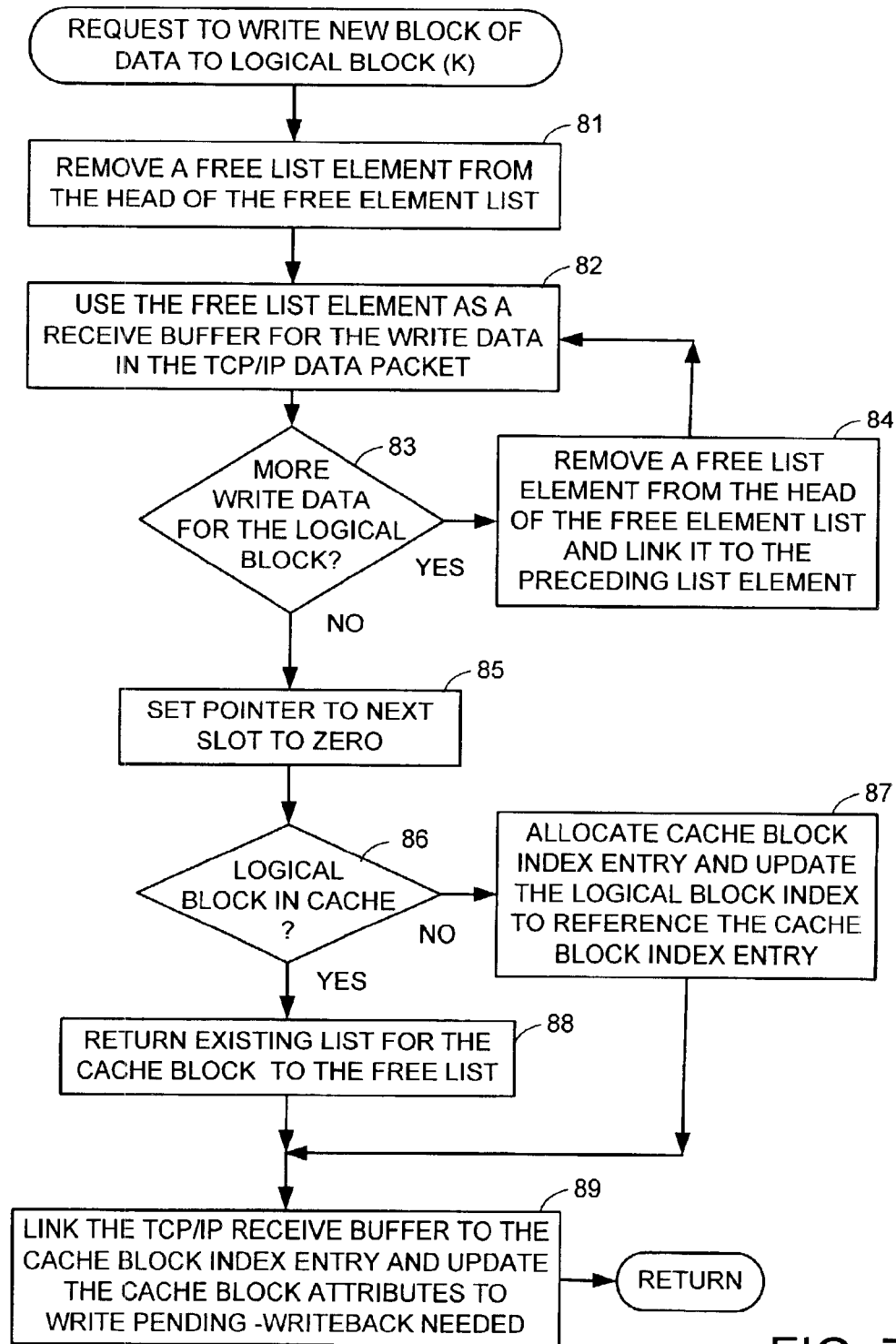
FIG. 7 is a flowchart of a procedure for responding to a request to write a new block of data to a specified logical block.

FIG. 7 shows a procedure executed by the storage controller for responding to a client request to write a new block of data to a specified logical block (K). In a first step 81, the storage controller removes a free list element from the head of the list of free elements. (If the list of free elements is found to be empty, then the least-recently-used cache block can be de-allocated to free some list elements and re-populate the list of free elements.) Then, in step 82, the storage controller uses the free list element as a receive buffer for a fragment of the write data received in a TCP/IP data packet associated with the client request. Then in step 83, execution branches if there is more write data for the logical block. If so, then execution branches from step 83 to step 84. In step 84, the storage controller removes another free list element from the head of the list of free elements, and links the free list element to the preceding list element. Execution then loops from step 84 back to step 82.

Once all of the data fragments for writing to the logical block have been received and linked into a list of the list elements, execution continues from step 83 to step 85. In step 85, the storage controller sets the pointer to the next slot of the last list element to zero. Then in step 86, the storage controller tests whether the specified logical block (K) is in cache. If not, then execution branches from step 86 to step 87 to allocate a cache block index entry to the logical block and to update the logical block index to reference this cache block index entry. Execution continues from step 87 to step 89.

In step 86, if the logical block is in cache, then in step 88 any existing list for the cache block is returned to the free list. Execution continues from step 88 to step 89. In step 89, the TCP/IP receive buffer (i.e. the list of list elements having received the TCP/IP data) is linked to the cache block index entry and the cache block attributes are updated to indicate a write pending and indicate that a write-back operation needs to be initiated. After step 89, the procedure of FIG. 7 is finished.

Figure 8:
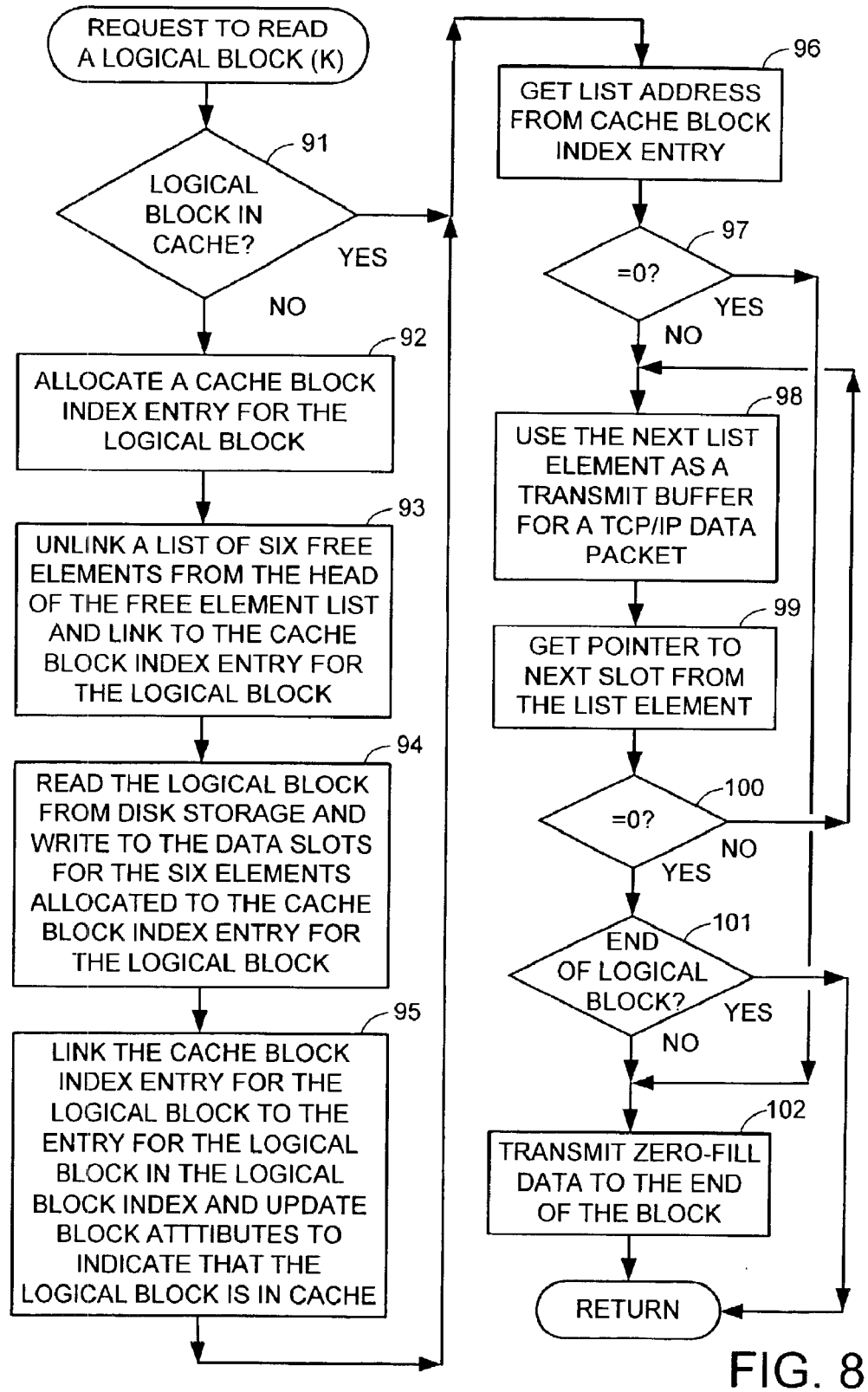
FIG. 8 is a flowchart of a procedure for responding to a request to read a logical block from storage.

FIG. 8 shows a procedure executed by the storage controller for responding to a client request to read a specified logical block (K). In a first step 91, execution branches depending on whether the specified logical block is in cache. If the in-cache flag of the logical block index indicates that the logical block is not in cache, then execution continues from step 91 to step 92. In step 92, the storage controller allocates a cache block index entry for the logical block. Then in step 93, the storage controller unlinks a list of six free elements from the head of the free element list and links these six free elements to the cache block index entry for the logical block. Then in step 94 the storage controller reads the logical block from the disk storage and writes the data from the disk storage to the data slots of the six list elements allocated to the cache block index entry for the logical block. This list of six list elements, for example, has the format shown in FIG. 5. Then, in step 95, the cache block index entry for the logical block is linked to the entry for the logical block in the logical block index, and the logical block attributes for the logical block (e.g., the in-cache flag) are updated to indicate that the logical block is now in cache. After step 95, execution continues to step 96. Execution also branches from step 91 to step 96 if in step 91 the specified logical block is found to be in cache.

In step 96, the storage controller gets the list address for the logical block from the cache block index entry. Then in step 97 execution branches depending on whether this list address is equal to 0. If the list address is not 0, then execution continues from step 97 to step 98. In step 98, the storage controller uses the list element as a transmit buffer for a TCP/IP data packet transmitted to the client having requested the logical block. Then in step 99, the storage controller gets the pointer to the next slot from the list element. In step 100, if this pointer is not equal to 0, then execution loops back to step 98 to transmit another TCP/IP data packet from the pointed-to list element. Eventually, once all of the data from the linked list of list elements has been transmitted, the pointer to the next slot from the list element will become equal to 0 and execution will then continue from step 100 to step 101. In step 101, execution branches depending upon whether the end of the logical block has been reached after transmission of all of the data from the linked list of list elements. If so, then execution returns. Otherwise, execution continues to step 102. In addition, execution branches to step 102 from step 97 if the list address from the cache block index entry is equal to 0. In either case, in step 102, the IP port of the storage controller transmits zero-fill data until an entire block of data has been transmitted to the client. After step 102, the procedure of FIG. 8 is finished.

Figure 9:
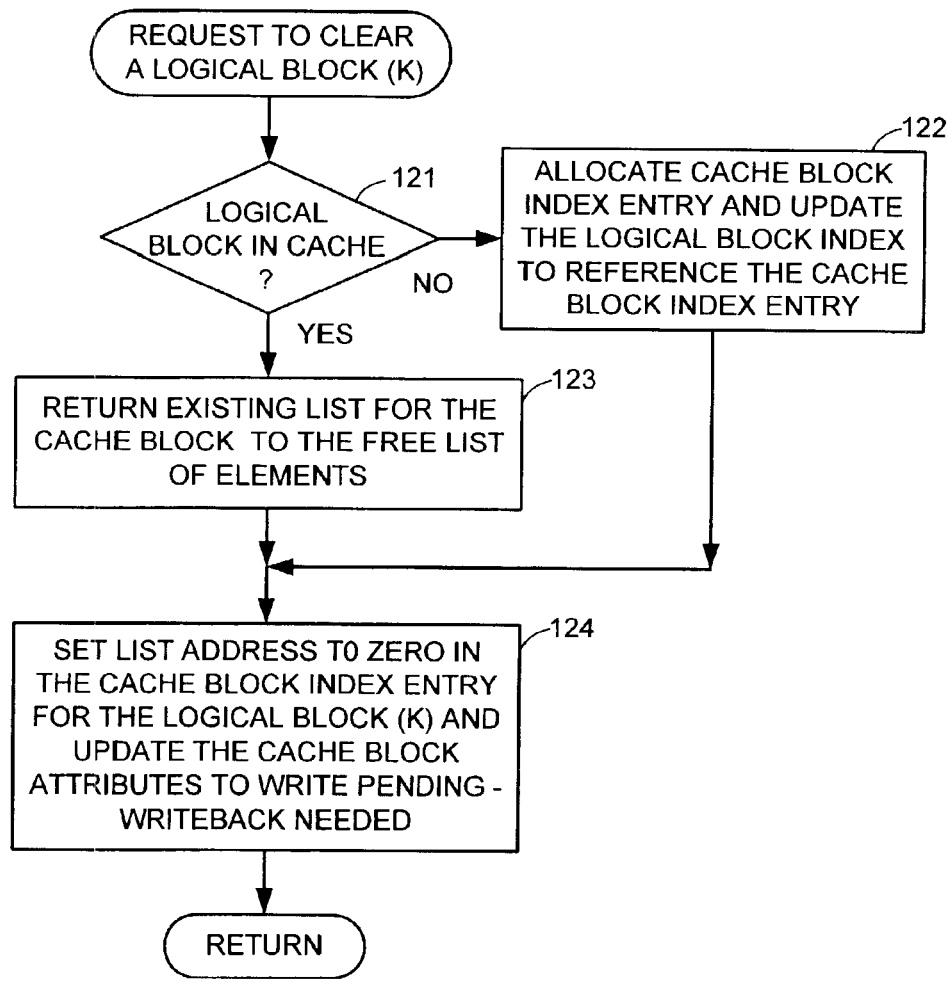
FIG. 9 is a flowchart of a procedure for responding to a request to clear a logical block.

FIG. 9 shows a procedure executed by the storage controller in response to a request to clear a specified logical block. In a first step 121, the storage controller accesses the logical block index to test whether the logical block is in cache. If not, then execution branches to step 122 to allocate a cache block index entry and update the logical block index to reference the cache block index entry. In step 121, if the logical block is in cache, then execution continues to step 123 to return the existing list for the cache block to the list of free list elements. In other words, the pointer-to-next-slot in the last element of the existing list is set to the present value of the pointer to the list of free list elements, and the address of the first element in the existing list becomes the new value of the pointer to list of free list elements.

After step 122 or 123, execution continues to step 124. In step 124, the storage controller sets the list address to zero in the cache block index entry for the specified logical block (K) and updates the cache block attributes to write pending, write-back needed. After step 124, the procedure of FIG. 9 is finished.

Figure 10:
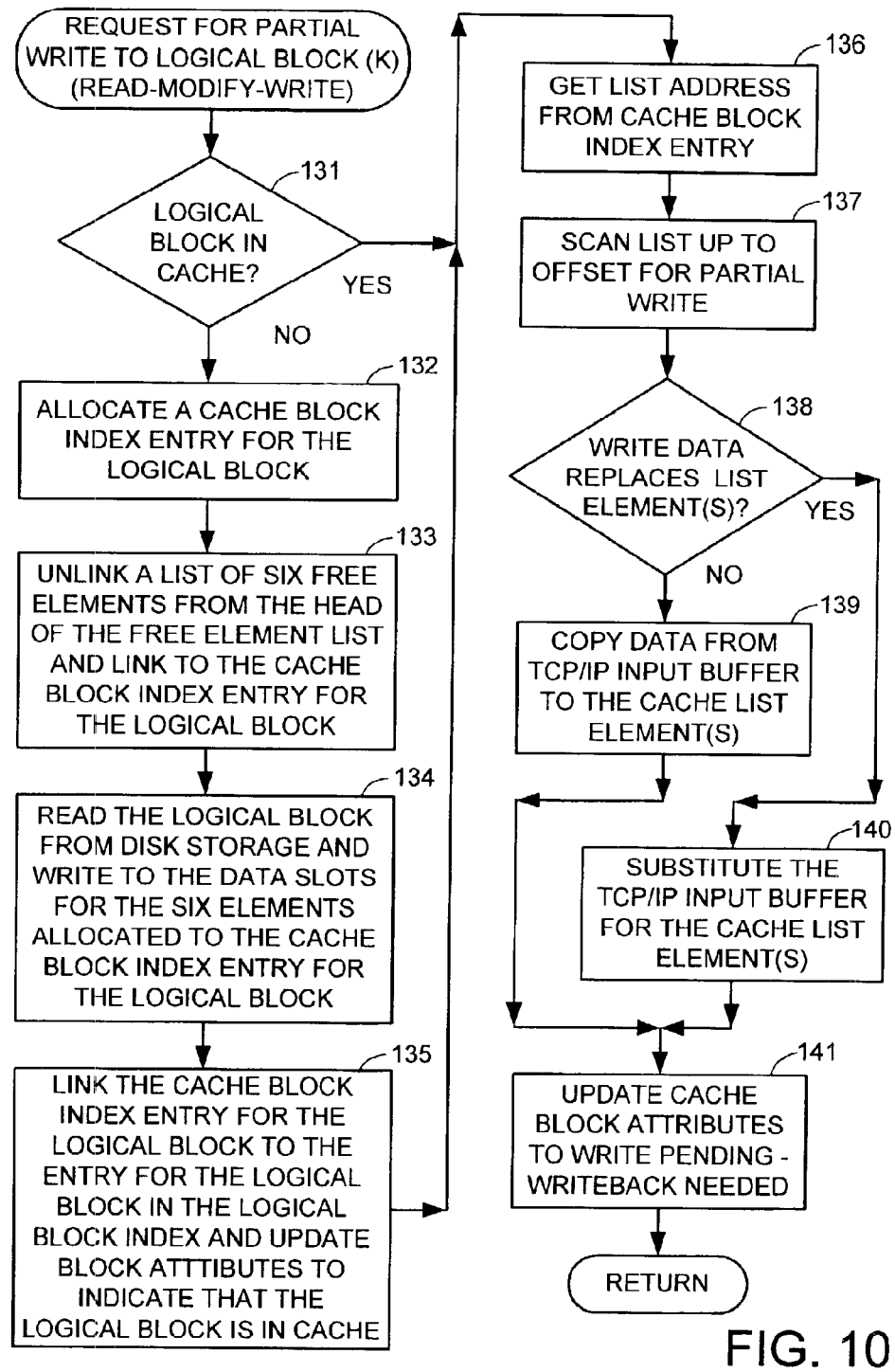
FIG. 10 is a flowchart of a procedure for responding to a request for a partial write to a specified logical block.

FIG. 10 shows a procedure executed by the storage controller in response to a client request for a partial write to a specified logical block (K). Such an operation is a "read-modify-write" if the specified logical block (K) is not already in cache, because only full cache blocks are written back to disk storage. The organization of the cache block as a linked list of list elements permits such a partial write to be done in a more efficient manner if a list element containing the new data to be written can simply be substituted for a list element containing the old data of the cache block. For example, a client application could be written to request either full writes to cache blocks or only partial writes of complete data fragments in the linked list format of FIG. 5. The application could reduce the use of any such partial writes by using data structures (such as tables) having fields aligned on the data fragment boundaries.

In the first step 131, the logical block index is accessed to determine whether the logical block is in cache. If not, then execution continues to steps 132, 133, 134 and 135, which are similar to steps 92 to 95 in FIG. 8. Steps 132, 133, 134, and 135 stage the logical block from disk storage to a cache block linked-list data structure having the format shown in FIG. 5. After step 135, execution continues to step 136. Execution also branches to step 136 from step 131 if the specified logical block (K) is found to be in cache.

In step 136, the storage controller gets the list address from the cache block index entry for the specified logical block (K). Then in step 137 the storage controller scans the list up to a specified byte offset for the partial write. In step 138, execution branches to step 139 if the write data does not replace a list element in the linked list of list elements for the cache block. In step 139, the storage controller copies data from the TCP/IP input 11 buffer to the cache list elements. The list elements used as the TCP/IP input buffer can then be returned to the list of free list elements.

In step 138, if the write data simply replaces a list element (or a sequence of list elements) of the cache block, then execution branches to step 140. In step 140, the TCP/IP input buffer (containing the new write data) is substituted for the corresponding list elements of the cache block (containing the old data to be written over). In other words, the list elements of the cache block containing the old data are unlinked from the linked list of the cache block, the list elements of the TCP/IP input buffer containing the new data are linked into the linked list of the cache block, and the list elements containing the old data are returned to the list of free list elements. Execution continues from step 139 and step 140 to step 141. In step 141, the cache block attributes are updated to indicate write pending, writeback needed. After step 141, the procedure of FIG. 10 is finished.

Figure 11:
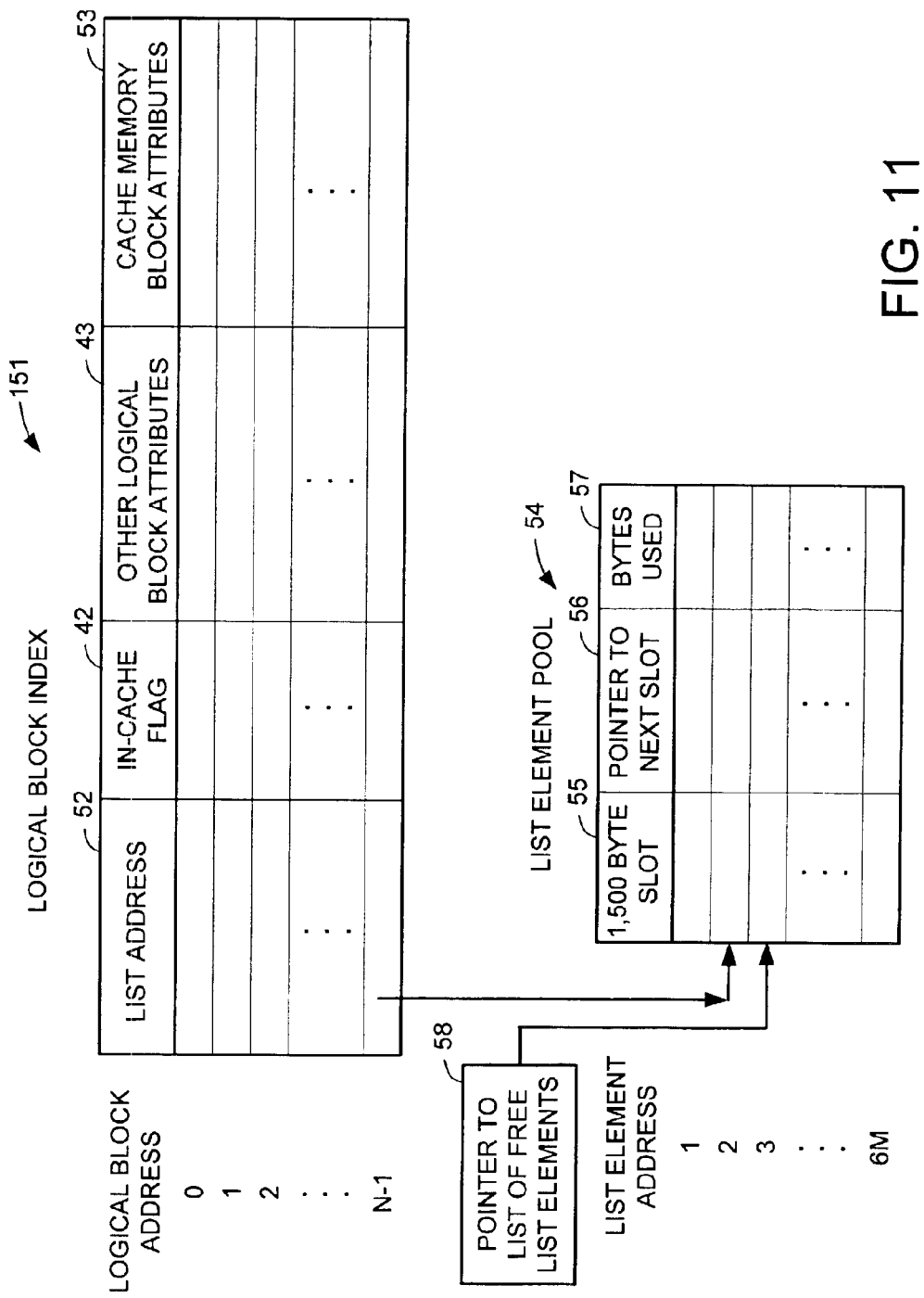
FIG. 11 is an alternative organization of cache memory data structures in accordance with the invention.

FIG. 11 shows an alternative cache memory organization in accordance with the present invention. In this case, the cache block index 51 of FIG. 4 has been merged with the logical block index 40 of FIG. 4 to produce the logical block index 151 shown in FIG. 11. The logical block index 151 includes, for each logical block, the associated list address 52 (valid only if the logical block is in cache), the in-cache flag 42, the other logical block attributes 43, and the cache memory block attributes (valid only if the logical block is in cache). The list element pool 54 has the same organization as in FIG. 4.

Figure 12:
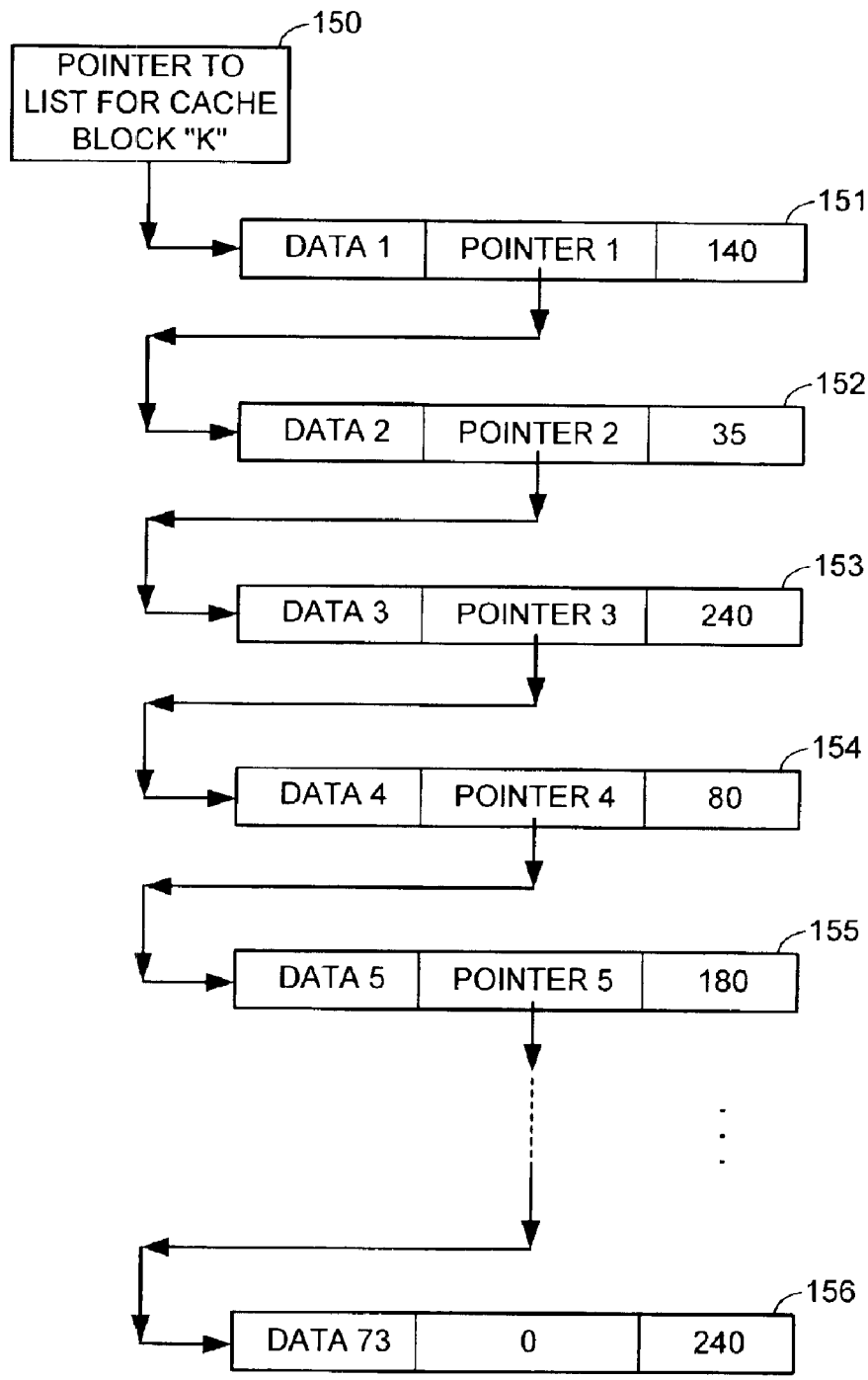
FIG. 12 is a schematic diagram showing a list of list elements for a case where the data slots are only partially filled with respective data fragments.

FIG. 12 shows a typical example of a linked list of list elements substituting for an eight-kilobyte cache memory block "K", where each element of the linked list has a II data slot filled with a respective data packet from network data transmission in accordance with TCP. In this example, the list includes a first list element 151 including 140 bytes of data of a first data fragment (DATA 1), a second list element 152 including 35 bytes of data of a second data fragment (DATA 2), a third list element 153 including 240 bytes of data of a third data fragment (DATA 3), a fourth list element 154 including 80 bytes of data of a fourth data fragment (DATA 4), a fifth list element 155 including 180 bytes of data of a fifth data fragment (DATA 5), and a seventy-third list element 156 including 240 bytes of data of a seventy-third data fragment (DATA 73). The pointer to next in the sixth list element 66 is zero, indicating the end of the list. The list address 150 points to the first list element 151 in the list.

In the example of FIG. 12, each list element has its respective data slot only partially filled, and in most cases less than half filled with data. In the worst case, the data slot of each list element could be filled with only one byte of data, so that 8192 data packets would be needed to entirely fill an 8 K byte cache block. When the fragmentation of a cache block becomes too high, it is desirable to merge the network data packets in order to keep the number of elements of the linked list for the cache block within a reasonable range, and to minimize the number of list elements in order to reduce the overhead of list transitioning from one list element to the next when accessing the list for a client or write-back to disk storage. The network data packets can be merged in a background process relative to the process of responding to requests to access specified logical blocks of data in the data storage, so that in most cases the number of list elements in the linked list of a cache block will be reduced between the time that data from a network client has been written to a cache block and the time that the cache block is later accessed by a client or written back to disk storage.

Figure 13:
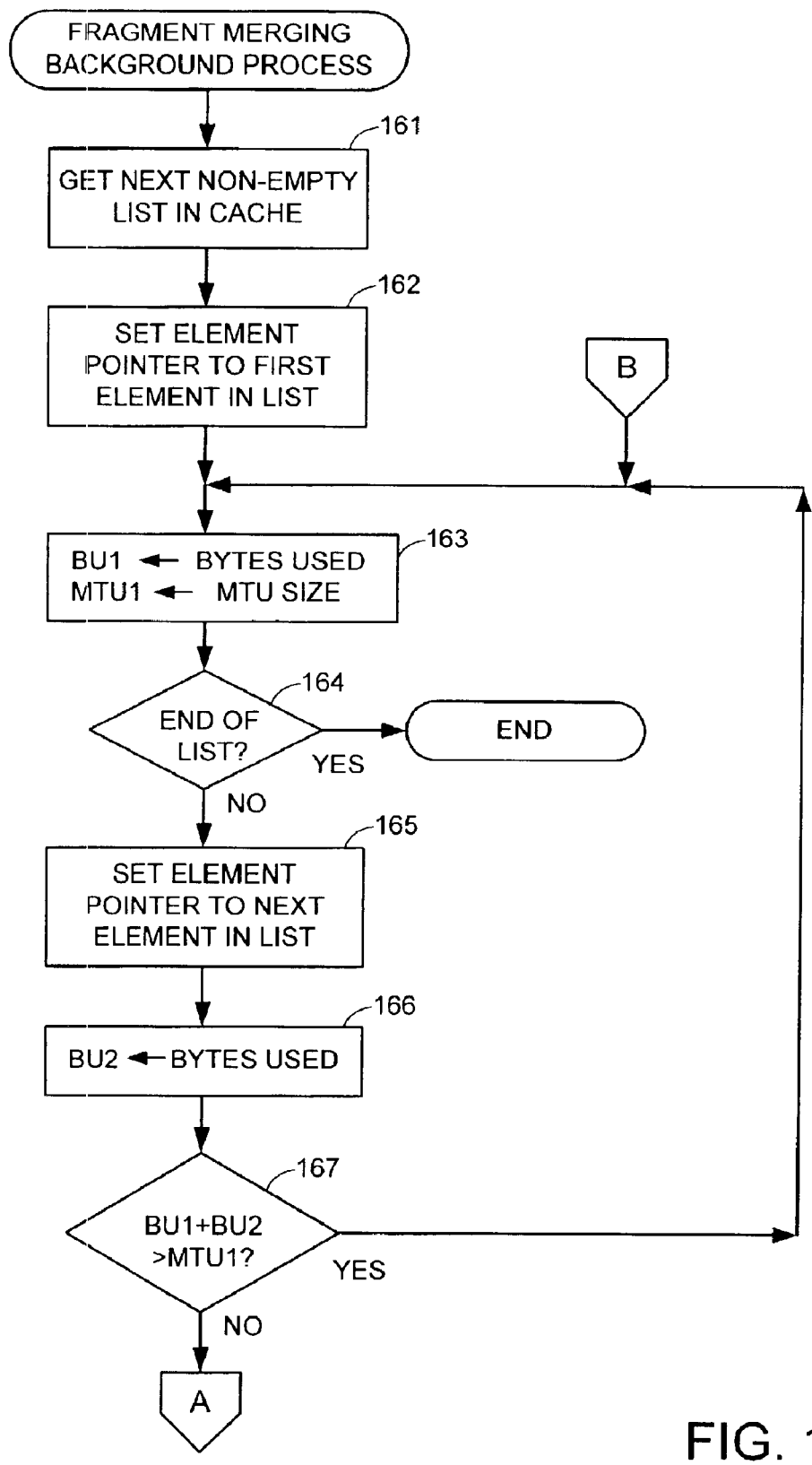
FIGS. 13 and 14 comprise a flowchart of a background process for merging data fragments of a logical block of data in the cache memory in order to reduce the number of list elements in the list for the logical block.

FIG. 13 shows a first sheet of a flowchart of a fragment merging background process. This background process is periodically invoked, for example, by a task scheduler of the storage controller when the storage controller has processing time that is not being used for higher-priority tasks such as servicing client requests or writing back data from cache to disk storage. In general, each time the background process is invoked, a cache list is processed by scanning the elements in the list to determine whether or not neighboring list elements in total have less data than the cache slot size of the earlier of the neighboring list elements. If so, the data in the later of the neighboring list elements is copied to the empty portion of the cache slot of the earlier of the neighboring list elements, and then the later of the neighboring list elements is removed from the list.

In FIG. 13, in a first step 161, the storage controller gets a next non-empty list of elements in cache for processing. This could be done, for example, by looking for a new cache block pointer having been inserted at the tail of the write-pending list and processing the list of elements for such a new cache block pointer, or by servicing a list of fragment-merge-pending cache blocks. For example, whenever a client writes a new list of elements to a cache block, a pointer to the cache block is inserted at the tail of the list of fragment-merge-pending cache blocks at the same time that a pointer to the cache block is inserted at the tail of the list of write-pending cache blocks. In this example, the fragment merging background process would get a next non-empty list in cache in step 161 by removing the pointer to the cache block at the head of the list of fragment-merge-pending cache blocks.

In step 162 of FIG. 13, the storage controller sets an element pointer to point to the first element of the list selected in step 161. Then in step 163, the storage controller accesses this list element to find the number of bytes used in the data slot of the list element, and for the case where the data slot size is not fixed, to find the data slot size of the list element. (For the storage system of FIG. 1 as described above, the data slot size is fixed at 1,500 bytes, but for the storage system of FIG. 15 as described below, the data slot size of each element in the list can have any one of three different sizes.)

In step 164, if the end of the list has been reached, then the fragment merging background process is finished processing the list. Otherwise, execution continues to step 165. In step 165, the storage controller advances the element pointer to point to the next element in the list, so that this next list element becomes the current list element. In step 166, this current list element is accessed to find the number of bytes used in the data slot of the current list element. In step 167, the sum of the number of bytes used (BU1) in the data slot of the previous list element and the number of bytes used (BU2) the current list element is compared to the size (MTU1) of the data slot of the previous list element. If the sum (BU1+BU2) is greater than the size (MTU1) of the data slot of the previous list element, then the data fragment in the current list element cannot be merged into the previous list element, and therefore execution loops back to step 163 to continue the fragment merging background process. Otherwise, execution continues from step 167 to step 171 of FIG. 14.

Figures 14, 16:
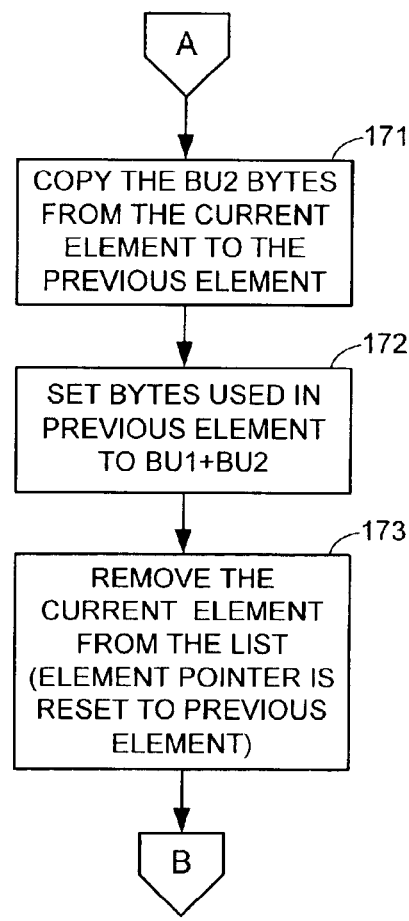
FIG. 16 shows a list element pool in which all of the list elements in the pool have the same data slot size, and each of the list elements has a field indicating the data slot size of the list element.

In step 171 of FIG. 14, the (BU2) bytes in the data slot from the current list element are copied into the unused memory space in the data slot of the previous element, so that the BU2 bytes are appended to the BU1 bytes in the data slot of the previous element. Next, in step 172, the "bytes used" field in the previous list element is set to the 11 sum BU1+BU2. Finally, in step 173, the current element is removed from the list and returned to the pool of free list elements, and this removal step resets the element pointer to point to the previous element. After step 173, execution loops back to step 163 of FIG. 13. This fragment merging background process continues until the end of the list is reached in step 164 of FIG. 13.

Figure 15:
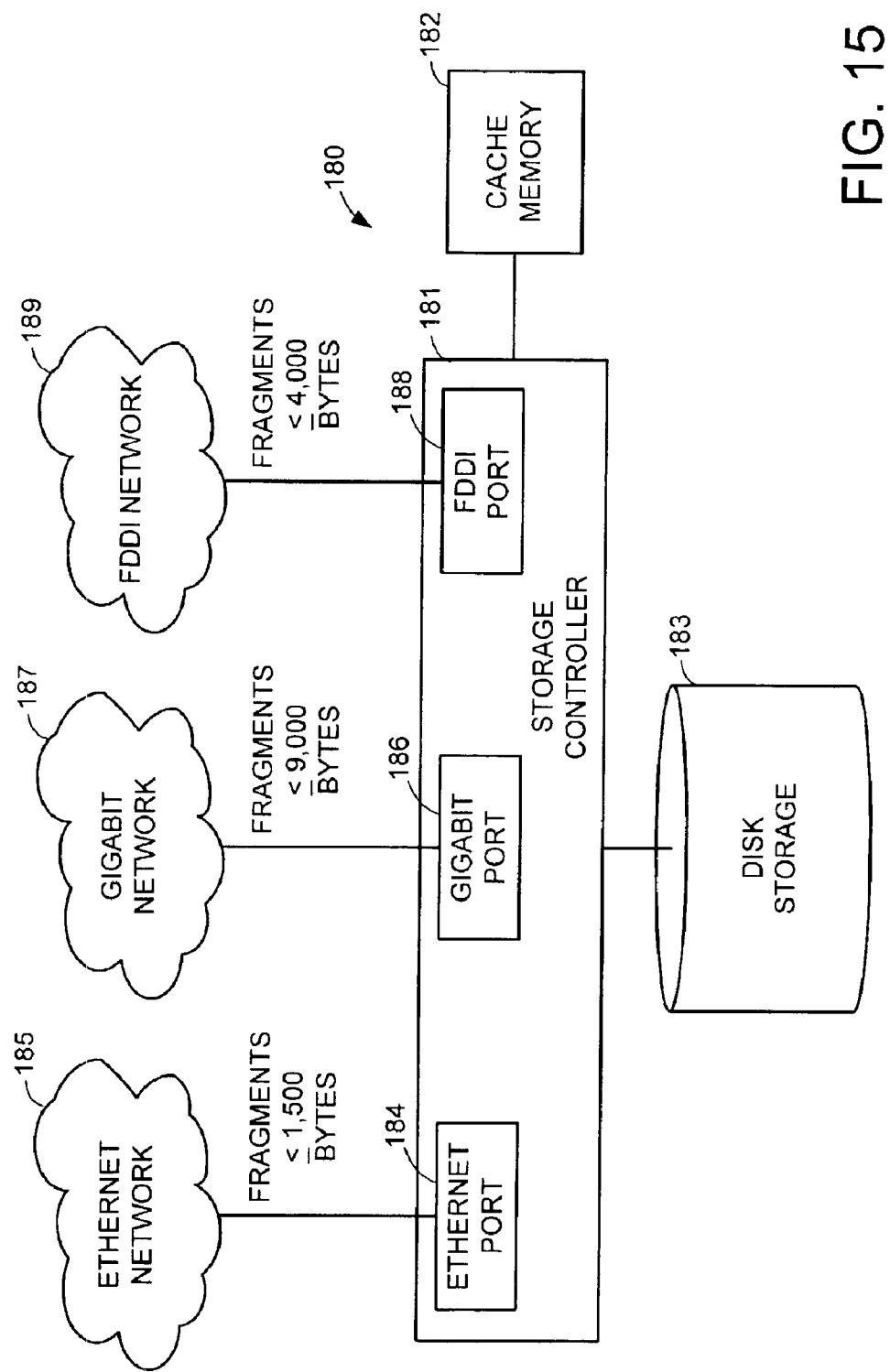
FIG. 15 shows a data storage system in which the same data storage may be accessed over different types of network interfaces, each having a different maximum data transfer unit size (MTU)

Referring now to FIG. 15, there is shown a data storage system 180 in which the same data storage can be accessed over different types of network interfaces. The data storage system 180 includes a storage controller 181, a cache memory 182, and disk storage 183. The storage controller 181 includes an Ethernet port 184 interfacing the data storage system 180 to clients (not shown) in an Ethernet network 185, a Gigabit port 186 interfacing the storage system 180 to clients (not shown) in a Gigabit network 187, and a Fiber Distributed Data Interface (FDDI) port 188 interfacing the storage system 180 to clients (not shown) in an FDDI network 189.

In the data storage system 180, it is desirable for certain data objects such as files in the disk storage 183 to be shared among clients in the different types of data networks 185, 187, 189. Each of the different types of data network transmits and receives data packets including respective data fragments having a different maximum transfer unit (MTU) size. For example, a data fragment in a data packet of the Ethernet network 185 has no more than 1,500 bytes, a data fragment in a data packet of the Gigabit network 187 has no more than 9,000 bytes, and a data fragment in a data packet of the FDDI network 189 has no more than 4,000 bytes.

In order to save cache memory, it is desirable for the list elements to have different data slot sizes, so that when each network port 184, 186, and 188 receives new data to be written to the cache memory 182, the network port can use list elements having a data slot size matching the MTU size of the data packets received by the network port. Moreover, it is desirable for the list processing operations to handle a list of elements for a cache block in such a way that each element can have a different data slot size.

To accommodate list elements having different data slot sizes, each list element is provided with a field for specifying the size of the data slot in the list element, and a respective list element pool is provided for each different data slot size. FIG. 16 shows the list elements in such a list element pool 190. The list element pool 190 is organized as a table in which each row of the table is a list element. Each list element includes a field 191 for the MTU size (i.e., the number of bits in the data slot 194), a field 192 for a pointer to the next element in the list, a field 193 indicating the number of bytes used in the data slot, and the data slot 194.

Figure 17:
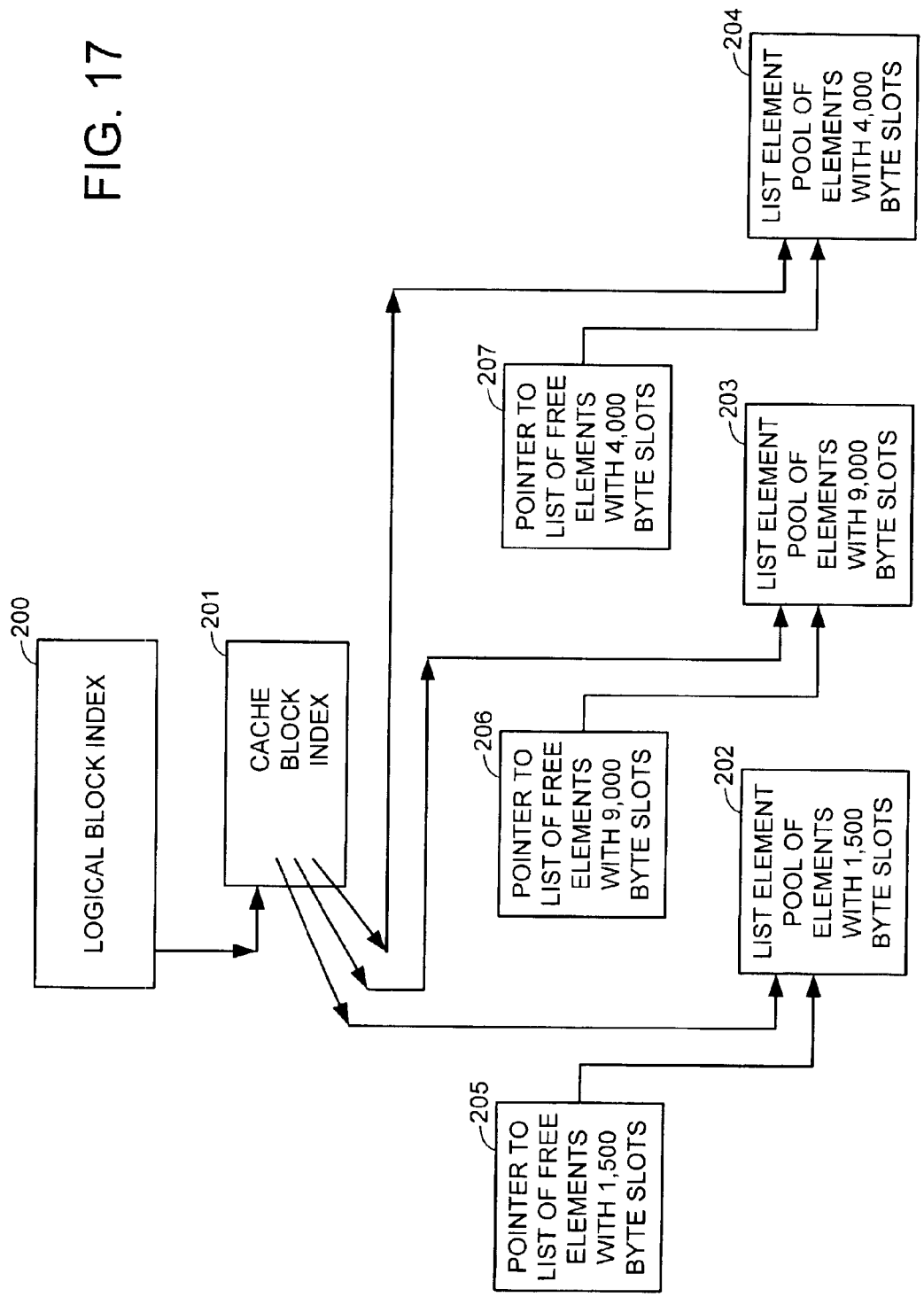
FIG. 17 shows cache memory data structures for managing the cache memory in the data storage system in FIG. 15, the cache memory data structures including a respective list element pool (as shown in FIG. 16) for each of the different types of network interfaces.

FIG. 17 shows cache memory data structures for managing the lists of elements for the cache blocks in the data storage system of FIG. 15. These cache memory data structures include a logical block index 200, a cache block index 201, a list element pool 202 of elements with 1,500 byte data slots, a list element pool 203 of elements with 9,000 byte data slots, a list element pool of elements with 4,000 byte data slots, and a respective "free list" pointer 205, 206, 207 for each of the pools of list elements 202, 203, 204. The logical block index 200 in FIG. 17 is similar to the logical block index 40 in FIG. 4, and the cache block index 201 in FIG. 17 is similar to the cache block index 51 in FIG. 4. Each list element pool 202, 203, 204 has the format shown in FIG. 16. Preferably the pointers to the list elements are cache memory addresses, so that it is easy to link list elements of different lengths from the different pools in the same list and to link a list beginning in any one of the list element pools 202, 203, 204 to an entry in the cache block index. Whenever a list element becomes free, it is returned to a respective list of free elements in its respective pool 202, 203, 204 of list elements.

In view of the above, there have been described network-attached cached disk storage systems in which data is transmitted over the network in data packets having a data length that is much smaller than the logical block size for reading or writing to disk storage. To avoid copying of data from network port buffers to the cache memory, the cache blocks of the cache memory are organized as linked lists of list elements, which can be used as network port input or output buffers. For TCP data packets, for example, each list element has a data slot for storing up to 1,500 bytes, and a field indicating the number of bytes stored in the data slot. In a data storage system having different types of network interfaces, the list elements may have different sizes, so that each different type of network interface may use list elements of a particular size for receiving network data to be written to the cache. In this case, each list element may have a field indicating the size of a data slot in the list element.

What is claimed is:

1. A storage system comprising a storage controller, a cache memory, and data storage, wherein the storage controller is programmed to respond to a request to access a specified logical block of data in the data storage by accessing a logical block index to determine whether or not the specified logical block of data is in the cache memory, and when the logical block index indicates that the specified logical block of data is in the cache memory, to access the specified logical block of data in the cache memory, and when the logical block index indicates that the specified logical block of data is not in the cache memory, to access the specified logical block of data in the data storage, wherein the cache memory contains a multiplicity of logical blocks of data, and each of the multiplicity of logical blocks of data contained in the cache memory is organized as a respective linked list of list elements containing fragments of the data of said each of the multiplicity of logical blocks of data contained in the cache memory.

2. The storage system as claimed in claim 1, wherein the storage controller has a network port for attachment to a data network for receiving data packets from clients in the data network, and the storage controller is programmed to respond to a request for writing new data to the specified logical block of data in the data storage by storing the new data into a respective linked list for the specified logical block of data in the data storage, wherein the respective linked list for the specified logical block of data in the data storage includes multiple list elements in the cache memory, and the storing of the new data into the respective linked list for the specified logical block of data in the data storage includes storing data of each data packet into a corresponding one of multiple list elements of the respective linked list for the specified logical block of data in the data storage.

3. The storage system as claimed in claim 1, wherein the storage controller is programmed to respond to a request for writing new data to the specified logical block of data in the data storage by storing the new data into a first linked list of multiple list elements in the cache memory, accessing the logical block index to identify a second linked list of multiple list elements in the cache memory containing old data of the specified logical block of data in the data storage, and updating the logical block index to associate the first linked list of multiple list elements with the specified logical block of data in the data storage.

4. The storage system as claimed in claim 3, wherein the storage controller has a network port for attachment to a data network for receiving data packets from clients in the data network, and wherein the storing of the new data into the first linked list includes storing data of each data packet into a corresponding one of the multiple list elements in the first linked list.

5. The storage system as claimed in claim 1, wherein the storage controller is programmed to respond to a request for writing a packet of new data to the specified logical block of data in the data storage by storing the packet of new data into a first list element in the cache memory, accessing the logical block index to identify a respective list of multiple list elements in the cache memory containing data of the specified logical block of data in the data storage, inspecting the respective list of multiple list elements in the cache memory containing data of the specified logical block of data in the data storage to identify a second list element in the cache memory containing old data of the specified logical block of data in the data storage, removing said second list element from the respective list of multiple list elements in the cache memory containing data of the specified logical block of data in the data storage, and inserting said first list element into the respective list of multiple list elements in the cache memory containing data of the specified logical block of data in the data storage in order to replace said first list element with said second list element in the respective list of multiple list elements in the cache memory containing data of the specified logical block of data in the data storage.

6. The storage system as claimed in claim 1, wherein the storage controller has a network port for attachment to a data network for communication of data packets is with clients in the data network, and wherein the storage controller is programmed to respond to a request from one of the clients for reading data from the specified logical block of data in the data storage by accessing the logical block index to identify a respective linked list of multiple list elements in the cache memory containing data of the specified logical block of data in the data storage, and transmitting to said one of the clients a series of data packets, each data packet in the series of data packets being a respective one of the list elements in the respective linked list of multiple list elements in the cache memory containing data of the specified logical block of data in the data storage.

7. The storage system as claimed in claim 1, wherein each list element in the respective linked list of said each of the multiplicity of logical blocks of data contained in the cache memory includes a data slot containing a number of bytes of data of said each of the multiplicity of logical blocks of data contained in the cache memory, a field for a pointer to a next list element in the respective linked list of said each of the multiplicity of logical blocks of data contained in the cache memory, and a field for an indication of how many bytes of data of said each of the multiplicity of logical blocks of data contained in the cache memory are contained in the data slot.

8. The storage system as claimed in claim 7, wherein said each list element in the respective linked list of said each of the multiplicity of logical blocks of data contained in the cache memory further includes a field for indicating a size of the data slot.

9. The storage system as claimed in claim 7, wherein each logical block of data in the data storage has a length of eight kilobytes, and the data slot of said each list element has a length of 1,500 bytes.

10. The storage system as claimed in claim 7, wherein the storage system has an Internet Protocol port for linking the storage system to clients in an Internet Protocol data network, the storage controller is programmed for receiving Transmission Control Protocol data packets at the Internet Protocol port and writing data of each Transmission Control data packet to the data slot of a respective one of the list elements in the cache memory.

11. The storage system as claimed in claim 1, wherein the cache memory includes list elements associated with respective logical blocks of data storage and free list elements not associated respective logical blocks of data storage, and the storage controller is programmed to initialize the cache memory by linking the list elements into a list of free list elements.

12. The storage system as claimed in claim 11, wherein the storage controller is programmed to respond to a request for writing new data to the specified logical block of data in the data storage by storing the new data into a first linked list of the list elements, accessing the logical block index to identify a second linked list of the list elements containing old data of the specified logical block of data in the data storage, inserting the second linked list of the list elements into the list of free list elements, and updating the logical block index to associate the first linked list of the list elements with the specified logical block of data in the data storage.

13. The storage system as claimed in claim 12, wherein the storage controller has a network port for attachment to a data network for receiving data packets from clients in the data network, and wherein the storing of the new data into a first linked list of the list elements includes storing data of each data packet into a corresponding one of the list elements in the first linked list of the list elements.

14. The storage system as claimed in claim 1, wherein the storage controller has a network port for attachment to a data network for communicating data packets with clients in the data network, and wherein the storage controller is programmed to use the list elements as transmit and receive buffers for communicating the data packets with the clients in the data network.

15. The storage system as claimed in claim 14, wherein the storage controller is programmed to use the Transmission Control Protocol for communicating the data packets with the clients in the data network, and wherein each of the list elements has a data length of 1,500 bytes.

16. The storage system as claimed in claim 1, wherein the storage controller has network ports of different types for receiving data packets of different respective maximum data lengths, and the storage controller is programmed so that the different types of network ports use list elements of different lengths for receiving the data packets of different respective maximum data lengths.

17. The storage system as claimed in claim 1, wherein the storage controller has network ports of different types, and the storage controller is programmed so that each different type of network port uses list elements of a respective different length corresponding to a respective maximum data length of data packets received by said each different type of network port.

18. The storage system as claimed in claim 17, wherein the storage controller is programmed to maintain the list elements of each respective different length in a respective list element pool including free and allocated list elements.

19. The storage system as claimed in claim 18, wherein the storage controller is programmed to maintain the free list elements in each list element pool in a respective list of free list elements for said each list element pool.

20. The storage system as claimed in claim 1, wherein at least some of the list elements of at least some of the respective linked lists have data slots larger than the fragments of data stored in said at least some of the list elements, and the storage controller is programmed to perform a fragment merging process upon said at least some of the respective linked lists for merging the data fragments in at least some neighboring ones of the list elements in said at least some of the respective linked lists in order to reduce the number of list elements contained in said at least some of the respective linked lists.

21. The storage system as claimed in claim 20, wherein the storage controller is programmed to perform the fragment merging process as a background process relative to a process for responding to requests to access specified logical blocks of data in the data storage.

22. A storage system comprising a storage controller, a cache memory, and data storage, wherein the storage controller is programmed to respond to a request to access a specified logical block of data in the data storage by accessing a logical block index to determine whether or not the specified logical block of data is in the cache memory, and when the logical block index indicates that the specified logical block of data is in the cache memory, to access the specified logical block of data in the cache memory, and when the logical block index indicates that the specified logical block of data is not in the cache memory, to access the specified logical block of data in the data storage;

wherein the cache memory contains a list element pool of list elements, and at least some of the list elements in the list element pool are linked in respective lists for a multiplicity of logical blocks of data;

wherein each list element in the list element pool includes a data slot, a field for a pointer to a next list element in the list element pool, and a field for an indication of how many bytes of data are contained in the data slot; and wherein the storage controller has a network port for attachment to a data network for communicating data packets with clients in the data network, and the storage controller is programmed to use the list elements as transmit and receive buffers for communicating the data packets with the clients in the data network.

23. The storage system as claimed in claim 22, wherein said each list element in the list element pool further includes a field for indicating a size of the data slot.

24. The storage system as claimed in claim 22, wherein the storage controller is programmed to communicate the data packets with the clients in the data network by storing data of each data packet received from the data network in a respective one of the list elements, and by reading data for each data packet transmitted to the data network from a respective one of the list elements.

25. The storage system as claimed in claim 22, wherein the storage controller is programmed to respond to a request for writing new data to the specified logical block of data in the data storage by storing the new data in a first linked list of a plurality of the list elements in the cache memory, accessing the logical block index to identify a second linked list of a plurality of the list elements in the cache memory containing old data of the specified logical block of data in the data storage, and updating the logical block index to associate the first linked list of a plurality of the list elements with the specified logical block of data in the data storage.

26. The storage system as claimed in claim 22, wherein the storage controller is programmed to respond to a request for writing a packet of new data to the specified logical block of data in the data storage by storing the packet of new data into a first list element in the cache memory, accessing the logical block index to identify a respective list of a plurality of the list elements in the cache memory containing data of the specified logical block of data in the data storage, inspecting the respective list of a plurality of the list elements in the cache memory containing data of the specified logical block of data in the data storage to identify a second list element in the cache memory containing old data of the specified logical block of data in the data storage, removing said second list element from the respective list of a plurality of the list elements in the cache memory containing data of the specified logical block of data in the data storage, and inserting said first list element into the respective list of a plurality of the list elements in the cache memory containing data of the specified logical block of data in the data storage in order to replace said first list element with said second list element in the respective list of a plurality of the list elements in the cache memory containing data of the specified logical block of data in the data storage.

27. The storage system as claimed in claim 22, wherein the storage controller is programmed to communicate with the clients in the data network using the Transmission Control Protocol, each logical block of data in the data storage has a length of eight kilobytes, and the data slot of each of the list elements has a length of 1,500 bytes.

28. The storage system as claimed in claim 22, wherein the storage controller is programmed to initialize the cache memory by linking the list elements into a list of free list elements.

29. The storage system as claimed in claim 28, wherein the storage controller is programmed to respond to a request for writing new data to the specified logical block of data in the data storage by storing the new data into a first linked list of the list elements, accessing the logical block index to identify a second linked list of the list elements containing old data of the specified logical block of data in the data storage, inserting the second linked list of the list elements into the list of free list elements, and updating the logical block index to associate the first linked list of the list elements with the specified logical block of data in the data storage.

30. A method of operating a storage system having a storage controller, a cache memory, and data storage for storing logical blocks of data, the storage controller having a network port for attaching the storage controller to a data network for communicating data packets with clients in the data network, the storage controller being programmed to respond to a request to access a specified logical block of data in the data storage by accessing a logical block index to determine whether or not the specified logical block of data is in the cache memory, and when the logical block index indicates that the specified logical block of data is in the cache memory, to access the specified logical block of data in the cache memory, and when the logical block index indicates that the specified logical block of data is not in the cache memory, to access the specified logical block of data in the data storage; wherein said method comprises:

said storage controller maintaining a pool of list elements in the cache memory, linking at least some of the list elements into respective linked lists for a multiplicity of the logical blocks of data stored in the data storage, and storing, in the list elements for each respective linked list for each of the multiplicity of the logical blocks of data stored in the data storage, the data of said each of the multiplicity of the logical blocks of data stored in the data storage; and said storage controller using the list elements as transmit and receive buffers for communicating the data packets with the clients in the data network.

31. The method as claimed in claim 30, wherein each list element in the pool of list elements includes a data slot, a field for a pointer to a next list element in the list element pool, and a field for an indication of how many bytes of data are contained in the data slot; and which includes storing, in the data slot, a portion of the data of at least one of the logical blocks of data in the data storage, and storing, in the field for an indication of how many bytes of data are contained in the data slot, a number indicating how many bytes of data are contained in the data slot.

32. The method as claimed in claim 30, which includes the storage controller communicating with the clients in the data network by storing data of each data packet received from the data network in a respective one of the list elements, and by reading data for each data packet transmitted to the data network from a respective one of the list elements.

33. The method as claimed in claim 30, which includes the storage controller responding to a request for writing new data to the specified logical block of data in the data storage by storing the new data in a first linked list of a plurality of the list elements in the cache memory, accessing the logical block index to identify a second linked list of a plurality of the list elements in the cache memory containing old data of the specified logical block of data in the data storage, and updating the logical block index to associate the first linked list of a plurality of the list elements with the specified logical block of data in the data storage.

34. The method as claimed in claim 30, which includes the storage controller responding to a request for writing a packet of new data to the specified logical block of data in the data storage by storing the packet of new data into a first list element in the cache memory, accessing the logical block index to identify a respective list of a plurality of the list elements in the cache memory containing data of the specified logical block of data in the data storage, inspecting the respective list of a plurality of the list elements in the cache memory containing data of the specified logical block of data in the data storage to identify a second list element in the cache memory containing old data of the specified logical block of data in the data storage, removing said second list element from the respective list of a plurality of the list elements in the cache memory containing data of the specified logical block of data in the data storage, and inserting said first list element into the respective list of a plurality of the list elements in the cache memory containing data of the specified logical block of data in the data storage in order to replace said first list element with said second list element in the respective list of a plurality of the list elements in the cache memory containing data of the specified logical block of data in the data storage.

35. The method as claimed in claim 30, which includes the storage controller communicating with the clients in the data network using the Transmission Control Protocol, and the data slot of each of the list elements has a length of 1,500 bytes.

36. The method as claimed in claim 30, which includes the storage controller initializing the cache memory by linking the list elements into a list of free list elements.

37. The method as claimed in claim 30, which includes the storage controller responding to a request for writing new data to the specified logical block of data in the data storage by storing the new data into a first linked list of the list elements, accessing the logical block index to identify a second linked list of the list elements containing old data of the specified logical block of data in the data storage, inserting the second linked list of the list elements into the list of free list elements, and updating the logical block index to associate the first linked list of the list elements with the specified logical block of data in the data storage.

38. The method as claimed in claim 30, wherein the storage controller has network ports of different types for receiving data packets of different respective maximum data lengths, and the storage controller is programmed so that the different types of network ports use list elements of different lengths for receiving the data packets of different respective maximum data lengths.

39. The method as claimed in claim 38, wherein the storage controller has network ports of different types, and each different type of network port uses list elements of a respective different length corresponding to a respective maximum data length of data packets received by said each different type of network port.

40. The method as claimed in claim 39, wherein the storage controller maintains the list elements of each respective different length in a respective list element pool including free and allocated list elements.

41. The method as claimed in claim 40, wherein the storage controller maintains the free list elements in each list element pool in a respective list of free list elements for said each list element pool.

42. The method as claimed in claim 30, wherein at least some of the list elements of at least some of the respective linked lists have data slots larger than the fragments of data stored in said at least some of the list elements, and the storage controller performs a fragment merging process upon said at least some of the respective linked lists for merging the data fragments in at least some neighboring ones of the list elements in said at least some of the respective linked lists in order to reduce the number of list elements contained in said at least some of the respective linked lists.

43. The method as claimed in claim 42, wherein the storage controller performs the fragment merging process as a background process relative to a process for responding to requests to access specified logical blocks of data in the data storage.

* * * * *